US006824460B2

(12) United States Patent
Young et al.

(10) Patent No.: US 6,824,460 B2
(45) Date of Patent: Nov. 30, 2004

(54) METHOD FOR REMOVING SKIN HAVING VARIATIONS IN THICKNESS FROM THE TORSO OF AN ANIMAL

(75) Inventors: William D. Young, Owatonna, MN (US); Kent L. Simonson, Austin, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 10/376,131

(22) Filed: Feb. 26, 2003

(65) Prior Publication Data

US 2004/0166793 A1 Aug. 26, 2004

(51) Int. Cl.[7] ............................................. A22B 5/08
(52) U.S. Cl. ....................................................... 452/83
(58) Field of Search .............................. 452/82–84, 94, 452/95, 97; 99/584, 585, 588, 593, 594

(56) References Cited

U.S. PATENT DOCUMENTS

| 4,272,862 A | * | 6/1981 | Griffin et al. ............... 452/127 |
|---|---|---|---|
| 4,332,190 A | * | 6/1982 | Mart ........................... 99/538 |
| 4,351,088 A | * | 9/1982 | Leining et al. ............. 452/127 |
| 4,369,547 A | * | 1/1983 | Robertson et al. .......... 452/127 |
| 4,417,367 A | | 11/1983 | Leining ........................... 17/21 |
| 4,433,453 A | | 2/1984 | Leining et al. ................. 17/21 |
| 4,606,093 A | * | 8/1986 | Townsend .................... 452/127 |
| 4,649,604 A | | 3/1987 | Braeger ........................... 17/62 |
| 4,784,056 A | * | 11/1988 | Townsend .................... 452/127 |
| 4,793,026 A | * | 12/1988 | Braeger et al. ............... 452/127 |
| 4,821,635 A | * | 4/1989 | Logan, Jr. ..................... 99/538 |
| 4,979,269 A | | 12/1990 | Norrie ......................... 452/134 |
| 5,011,454 A | | 4/1991 | Townsend .................... 452/125 |
| 5,122,091 A | * | 6/1992 | Townsend .................... 452/127 |
| 5,236,323 A | | 8/1993 | Long et al. .................. 452/127 |
| 5,288,264 A | * | 2/1994 | Braeger ....................... 452/127 |
| 5,399,118 A | | 3/1995 | Long et al. .................. 452/127 |
| 5,558,573 A | * | 9/1996 | Basile et al. ................ 452/127 |
| 5,609,519 A | * | 3/1997 | Townsend .................... 452/127 |
| 5,766,066 A | * | 6/1998 | Ranniger ..................... 452/127 |
| 5,997,394 A | | 12/1999 | Loseke ........................ 452/134 |
| 6,080,470 A | | 6/2000 | Dorfman ..................... 428/216 |
| 6,086,470 A | | 7/2000 | Ranniger ..................... 452/127 |
| 6,129,625 A | | 10/2000 | Cate et al. ................... 452/127 |
| 6,244,950 B1 | | 6/2001 | Long et al. .................. 452/127 |
| 6,277,019 B1 | | 8/2001 | Veldkamp et al. ........... 452/134 |
| 6,558,242 B2 | * | 5/2003 | Veldkamp et al. ........... 452/134 |
| 6,589,108 B2 | * | 7/2003 | Townsend .................... 452/125 |
| 2001/0036807 A1 | | 11/2001 | Veldkamp et al. ........... 452/134 |

* cited by examiner

*Primary Examiner*—Thomas Price
(74) *Attorney, Agent, or Firm*—IPLM Group, P.A.

(57) ABSTRACT

An apparatus for removing skin from a torso of an animal using a rotatable drum having a circumference. A gripper is positioned at a point on the circumference of the rotatable drum adapted to engage a portion of the skin causing the torso of the animal to rotate as the rotatable drum rotates. A sharp blade is positioned near the point on the circumference of the rotatable drum for cutting the skin from the animal. A dull blade is spaced a dull blade gap distance away from the circumference of the rotatable drum and a setback distance away from the sharp blade opposite from the gripper, the dull blade adapted to contact the skin of the animal as the animal rotates. An adjustment arm is coupled to the dull blade for controlling the dull blade gap distance. A controller is coupled to the adjustment arm for automatically adjusting dull blade gap distance in accordance with a predetermined profile for the dull blade gap distance which varies around the torso of the animal.

14 Claims, 6 Drawing Sheets

METHOD FOR REMOVING SKIN HAVING VARIATIONS IN THICKNESS FROM THE TORSO OF AN ANIMAL

TECHNICAL FIELD

This invention relates to methods and apparatus for removing skin from the torso of an animal and, in particular, to such methods and apparatus for the skin has variations in thickness around the torso.

BACKGROUND

In many commercial meat packing operations, the skin is usually removed from the animal carcass by pulling, or in some instances, the animal is butchered and the skin is removed thereafter from the primal cuts. However, when the skin is pulled from the carcass, a substantial amount of fat is sometimes removed with the skin. The fat must then be removed from the skin. Further, removal of the skin from primal cuts involves time consuming operations and involves the use of costly equipment.

Apparatus for removing the skin from the torso of an animal carcass, such as a hog, are well known in the art. An example is described in U.S. Pat. No. 4,351,088, Leining et al, Method and Apparatus For Removing Skin From Animal Carcasses, assigned to George A. Hormel Company. Leining et al '088 discloses an apparatus and method for removing the torso portion of the skin from the carcass of an animal, such as a hog. The apparatus includes an overhead support from which a carcass is suspended during the skin removing operation. The skin is first removed from the hind quarters of the carcass and then a cut is made in the skin of the torso completely around the carcass just rearwardly of the fore limbs. A flap forming blade makes a longitudinal cut in the carcass and the longitudinal edge of the skin defined by the longitudinal cut is gripped by revolvable toothed cylinders carried by a revolvable drum to form a flap which is wound about the toothed cylinder. A carcass engaging device holds the carcass against the drum during the flap forming operation. A flexible pressurized movable blade positioned adjacent the drum progressively cuts the skin from the carcass as the drum is revolved.

In many skin removal apparatus, the skin is removed by first peeling the skin back with a knife. A dull blade is then inserted between the peeled flap of skin and the carcass. As the carcass rotates, the dull blade peels the skin from the carcass. The dull blade is positioned a distance away from the carcass so that the skin from the carcass can pass between the dull blade and rotating cylinder. The distance which the dull blade is so positioned is known as the dull blade gap distance.

To account for variations in the thickness of the skin of the animal around the carcass as the carcass rotates, it is common to allow the dull blade to float permitting variations in the dull blade gap distance.

U.S. Pat. No. 6,086,470, Ranniger, Skinning Machine, and U.S. Pat. No. 5,766,066, Ranniger, Skinning Machine, disclose automatic skinning machines. A cutting shoe is adjustable by a camming structure to automatically move the cutting shoe between an initial position and a cutting position. In addition, the cutting shoe is mounted in a floating manner such that it can self adjust to different thicknesses of product flowing therethrough.

U.S. Pat. No. 4,272,862, Griffin et al, Skinning Apparatus, discloses a skinning apparatus with a cushioned, spring biased, cutting knife making it free to move slightly through a defined area and against a yieldable bias force.

U.S. Pat. No. 4,369,547, Robertson et al, Animal Skinning Machine, discloses an animal skinning machine with means to adjust the cutting depth of a knife as irregularities in the skin pass the knife. A resiliently cupped spring washer urges a roller against the skin and, if there are irregularities in the skin, the spring washer can be compressed to permit the roller to retract sufficiently to pass the irregularities.

In these apparatus, a passive biased, e.g., spring or resilient means, blade floats to permit variations in thickness of the skin of the carcass of the animal be skinned.

Alternatively, U.S. Pat. No. 4,979,269, Norrie, Method and Apparatus For Separating Back Fat From Loins, discloses a conveyor type skinning apparatus using an optical sensor to adjust the spacing between the conveyor and a skinning blade. A pressure device applies pressure to the upper surface of a loin portion. A generally arcuate blade is interposed between the conveyor and the pressure device, the blade being movable relative to the conveyor. The thickness of the back fast on the loin portion between the conveyor and the lean portion of the loin is sensed generating measurement signals thereby moving the blade. In order to position the blade as accurately as possible, a video camera and light source is provided alongside the conveyor, adjacent or slightly downstream of the position of the first of two pressure rolls. The camera functions to observe and sense the thickness of the portion of fat the loin lying lowermost on the conveyor as it approaches the knife blade. The knife can then be adjusted automatically.

The above-described methods and apparatus, however, still do not effectively adjust the dull blade gap in order to maximize the amount of lean left on the carcass while minimizing tearouts. If the dull blade gap is too large a portion of the lean meat of the carcass is removed along with the skin. This results in inefficiency. In the case of a hog, bacon is taken from the belly were the skin is thin. If the dull blade gap is not effectively set small over the belly portion of a hog, valuable bacon will be removed along with the skin. However, if the dull blade gap is not set thicker over the back portion of the hog, the skin will often tear out of the skinning machine preventing the efficient removal of the skin from the carcass of the animal.

SUMMARY OF THE INVENTION

Floating blades do not effectively adjust the dull blade gap thickness. Further, even skinning systems which attempt to major thickness of the skin been removed are subject to inaccuracies and inefficiencies due to inaccurate or ineffective measurement. It has been found that greater efficiencies can be obtained by using the present invention.

The present invention solves the inefficiency inherent in skinning systems with floating blades and measured systems. In an apparatus which is configured to repeatedly remove the skin from the torso portion of the carcass of a particular animal, it has been found that the thickness of the skin around the circumference of the carcass is relatively consistent from animal to animal. Thus, the dull blade gap distance can be predetermined and an apparatus for removing the skin from torso portion of the carcass of an animal may be preconfigured with dull blade gap distances which vary in accordance with the position around the circumference of the carcass contacted by the dull blade. These preset dull blade gap distances provide the most effective mechanism to preserve as much of the lean meat of the animal as possible while minimizing tearouts.

In an embodiment, the present invention provides a method of removing skin from an animal having a torso using an apparatus having a rotatable drum having a circumference, a gripper positioned at a point on the circumference of the rotatable drum adapted to engage a portion of the skin causing the carcass of the animal to rotate as the rotatable drum rotates, a sharp blade positioned near the point on the circumference of the rotatable drum for cutting the skin from the animal, a dull blade spaced a dull blade gap distance away from the circumference of the rotatable drum and a setback distance away from the sharp blade opposite from the gripper, the dull blade adapted to contact the skin of the animal as the animal rotates. A portion of the skin of the torso of the animal is gripped by the gripper. The drum is rotated causing the torso of the animal to rotate forcing the dull to peel the skin from the torso of the animal as the torso of the animal contacts the dull blade. The dull blade gap distance is adjusted in accordance with a predetermine profile which varies around the torso of the animal.

In a preferred embodiment, the skin of the hog is thicker around certain parts of the torso of the animal than around other parts of the torso of the animal and the adjusting step adjusts the dull blade gap distance wider where the certain parts of the torso of the animal are thicker and narrower where the other parts of the torso of the animal is thinner.

In a preferred embodiment, the hog has a stomach and a back, wherein the skin is thinner on the stomach, wherein the skin is thicker on the back, and the adjusting step the adjusts the dull blade gap distance narrower when the dull blade contacts the stomach of the hog and wider when the dull blade contacts the back of the hog.

In a preferred embodiment, the torso of the hog has a teat area, a flank and a back and the adjusting step adjusts the dull blade gap (a) narrower when the dull blade contacts the teat area of the hog, (b) wider when the dull blade contacts the flank of the hog, (c) narrower when the dull blade contacts the torso of the hog between the flank and the back of the hog, (d) wider when the dull blade contacts the back of the hog, and (d) narrower when the dull blade gap contacts the torso of the hog between the back and the teat area of the torso of the hog.

In a preferred embodiment, the animal is a hog.

DETAILED DESCRIPTION

Figure 1:
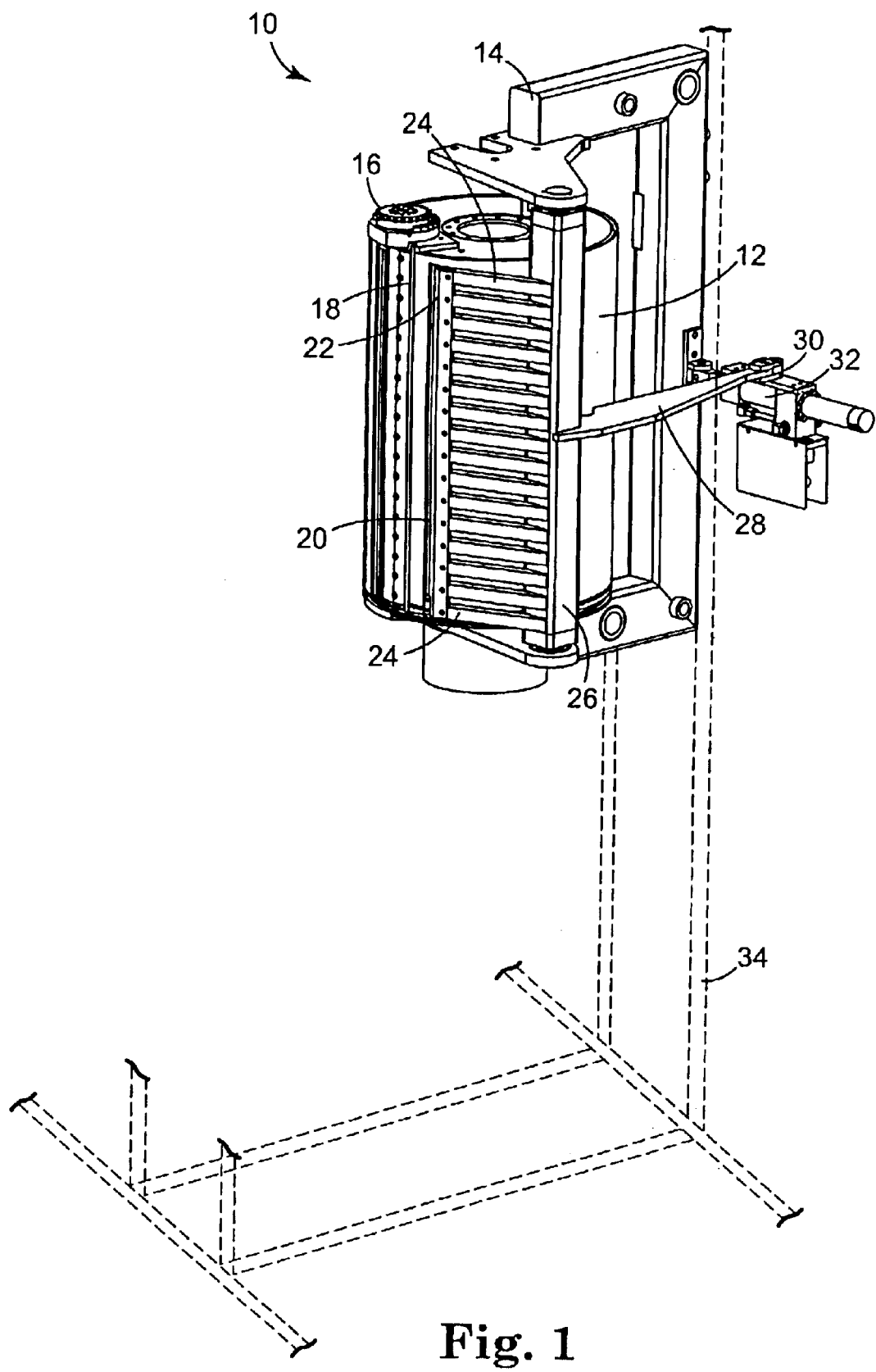
FIG. 1 illustrates an apparatus for removing skin from the torso of an animal in accordance with an embodiment of the present invention.
Figure 2:
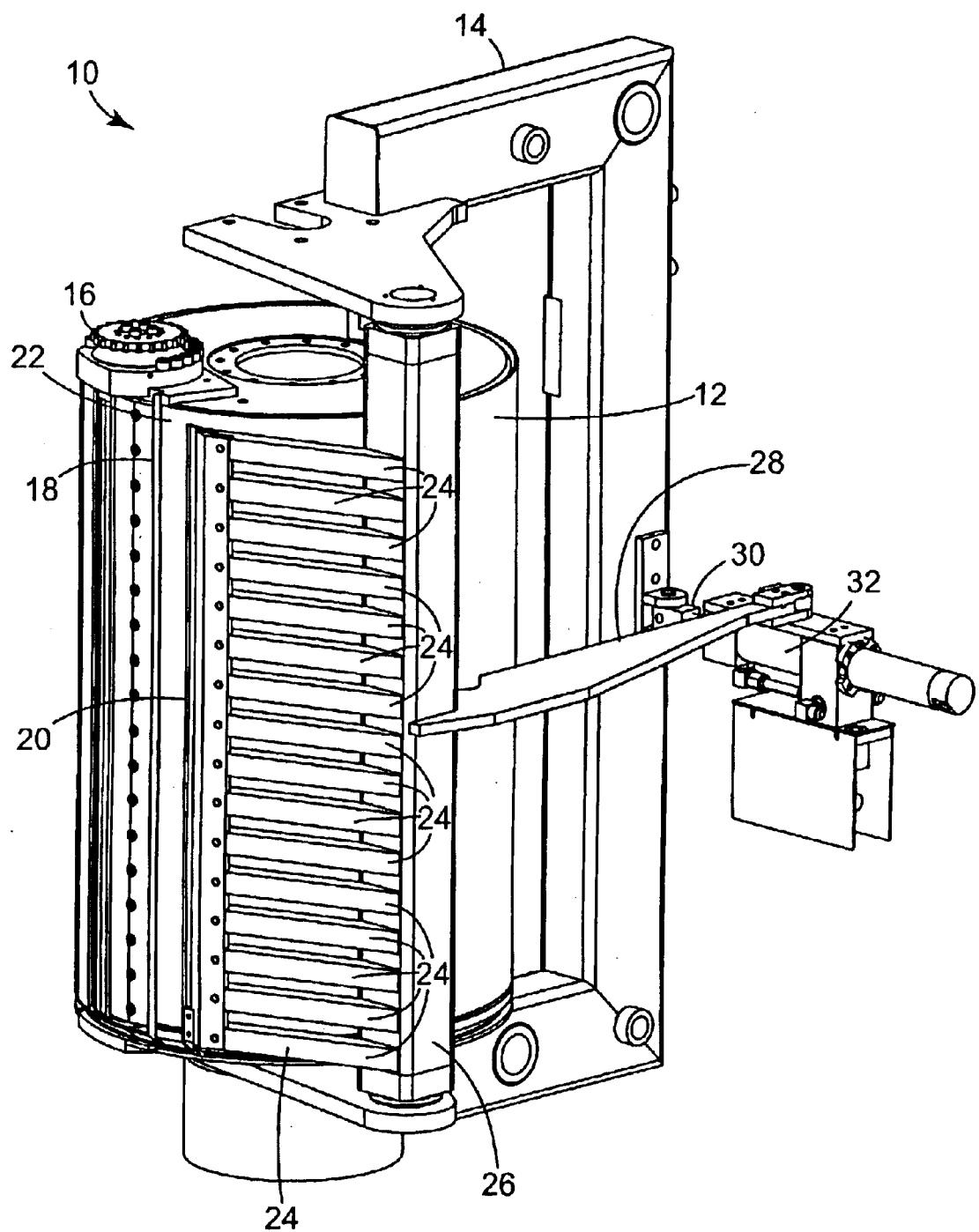
FIG. 2 illustrates a closeout perspective view of a portion of the apparatus illustrated in FIG. 1.
Figure 3:
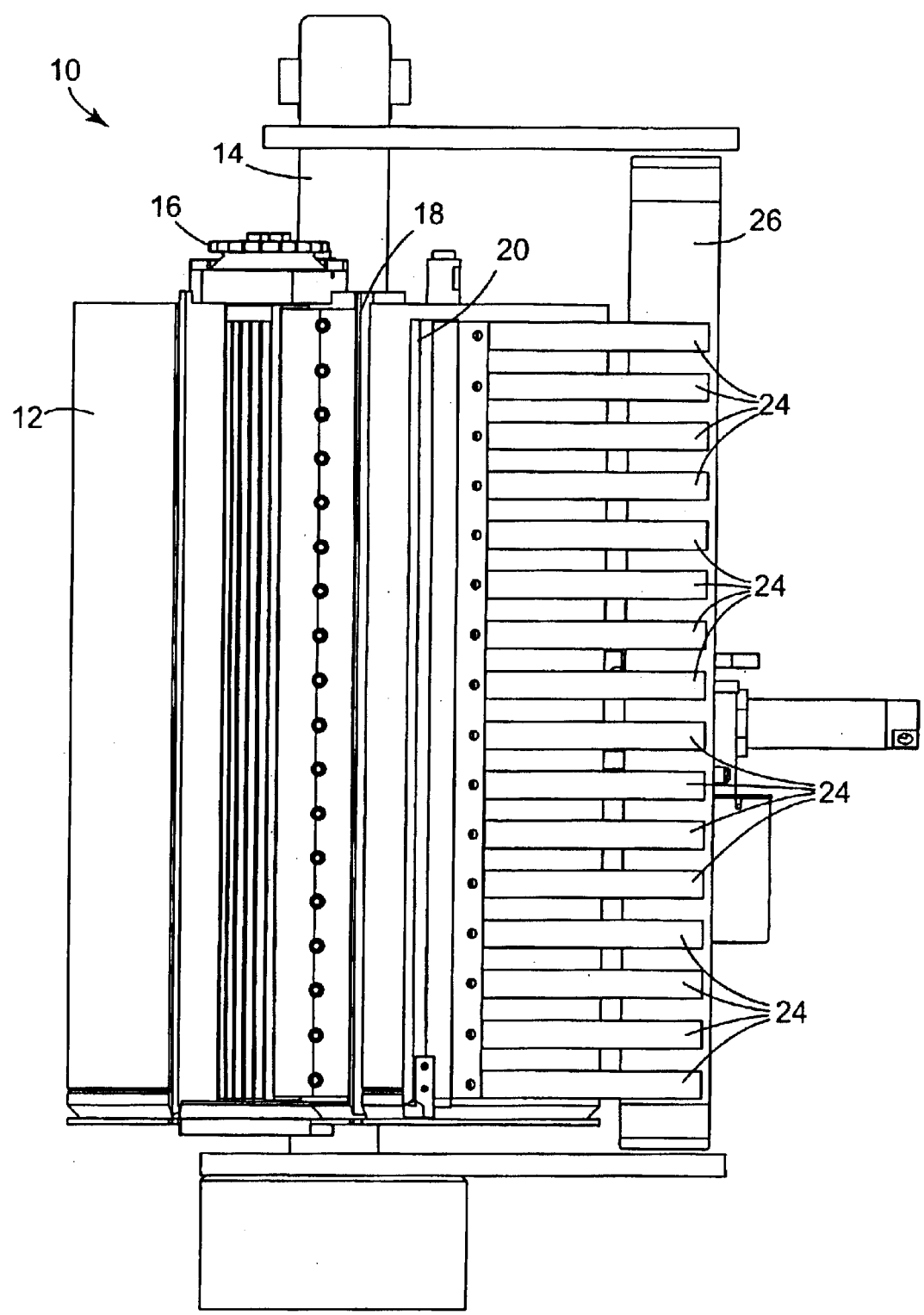
FIG. 3 is a side view of the portion of the apparatus illustrated in FIG. 2.

FIGS. 1 through 4 illustrate the hog skinning apparatus 10 of the present invention which automatically controls the dull blade gap distance 22 around the circumference of the hog. The dull blade gap distance 22 is controlled to maximize the yield of lean meat and minimize tear outs. Hog skinning apparatus 10 has a revolvable drum 12 with a vertical axis mounted in frame 14. Gripper 16 is adapted to receive a small portion of the skin of the hog which has been previously prepared with a longitudinal cut along the carcass of the hog. Sharp blade 18 is positioned along the periphery of revolvable drum 12 to engage the carcass of the hog and initiate the separation of the skin from the remainder of the carcass. Dull blade 20 is positioned a dull blade gap distance 22 away from the periphery of revolvable drum 12 and set back from sharp blade 18 (with respect to gripper 16) along the periphery of revolvable drum 12.

Dull blade 20 is rigidly affixed with a plurality of fingers 24 to a rectangular shaped rotatable column 26. Rectangular column 26 is, in turn, rigidly affixed to arm 28 which is movable by piston 30 of hydraulic cylinder 32 which is affixed to frame 14. As piston 30 of hydraulic cylinder 32 moves in, arm 28 moves to the left (in FIG. 4) which rotates column 26 causing fingers 24 to move dull blade 20 away from revolvable drum 12 creating an increased dull blade gap distance 22. As piston 30 of hydraulic cylinder 32 moves out, arm 28 moves to the left (again in FIG. 4) which rotates column 26 causing fingers 24 to move dull blade 20 in toward revolvable drum 12 creating a decreased dull blade gap distance 22.

FIG. 1 illustrates hog skinning apparatus 10 affixed in stand 34. The carcass of a hog (not shown), hung from a conveyor and having a longitudinal slice made in its skin, is brought into the proximity of hog skinning apparatus 10. The edge of the skin of the hog is grabbed by gripper 16 and drawn into and secured by revolvable drum 12. Revolvable drum 12 then begins to rotate (clockwise in FIG. 4) forcing the carcass into dull blade 20. With dull blade 20 positioned with a dull blade gap distance 22 which is proper for the thickness of the skin of the carcass, the rotation of revolvable drum 12 forces the skin, and, preferably, only the skin, between dull blade 20 and the periphery of revolvable drum 12. As revolvable drum 12 rotates and skin is drawn between dull blade 20 and revolvable drum 12, the carcass, suspended from a conveyor, also rotates.

Dull blade 20 is preferably adjusted such that the dull blade gap distance 22 passes only skin between dull blade 20 and the periphery of revolvable drum 12. If dull blade 20 is positioned such that dull blade gap distance 22 is too wide, some of the lean meat on the carcass in addition to the skin will be drawn between dull blade 20 and the periphery of revolvable drum 12. For example, over the belly portion of a hog a too large of a dull blade gap distance 22 may result in bacon from the belly of the hog being stripped from the carcass. This may significantly decreased the bacon yield from any given hog carcass. However, a dull blade gap distance 22 which is too narrow may mean that not all of the skin of the carcass can pass between dull blade 20 and the periphery of revolvable drum 12. Since not all of the skin may pass through the dull blade gap distance 22, the pulling of skin from the carcass of the hog increases in resistance significantly. This increase in resistance may result in the skin from the carcass tearing away from gripper 16 with the resulting cessation of skinning during the rotation. If this occurs, the skin from the carcass must be manually replaced into gripper 16 and the process started anew. This manual intervention takes time, slows the process and may significantly decrease the number of hogs which may be processed by the hog skinning apparatus 10.

Figure 4:
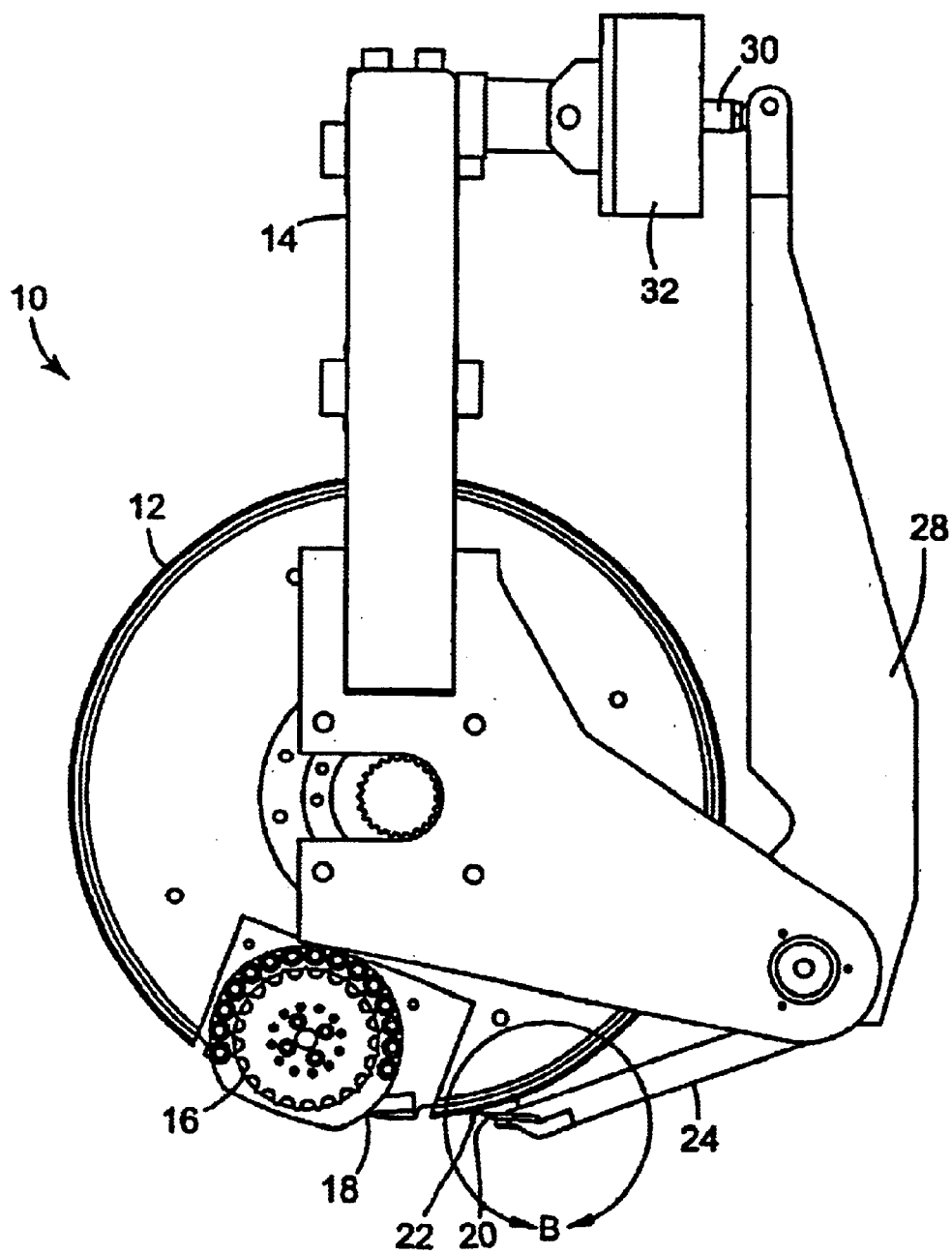
FIG. 4 is a top view of the portion of the apparatus illustrated in FIG. 2.
Figure 5:
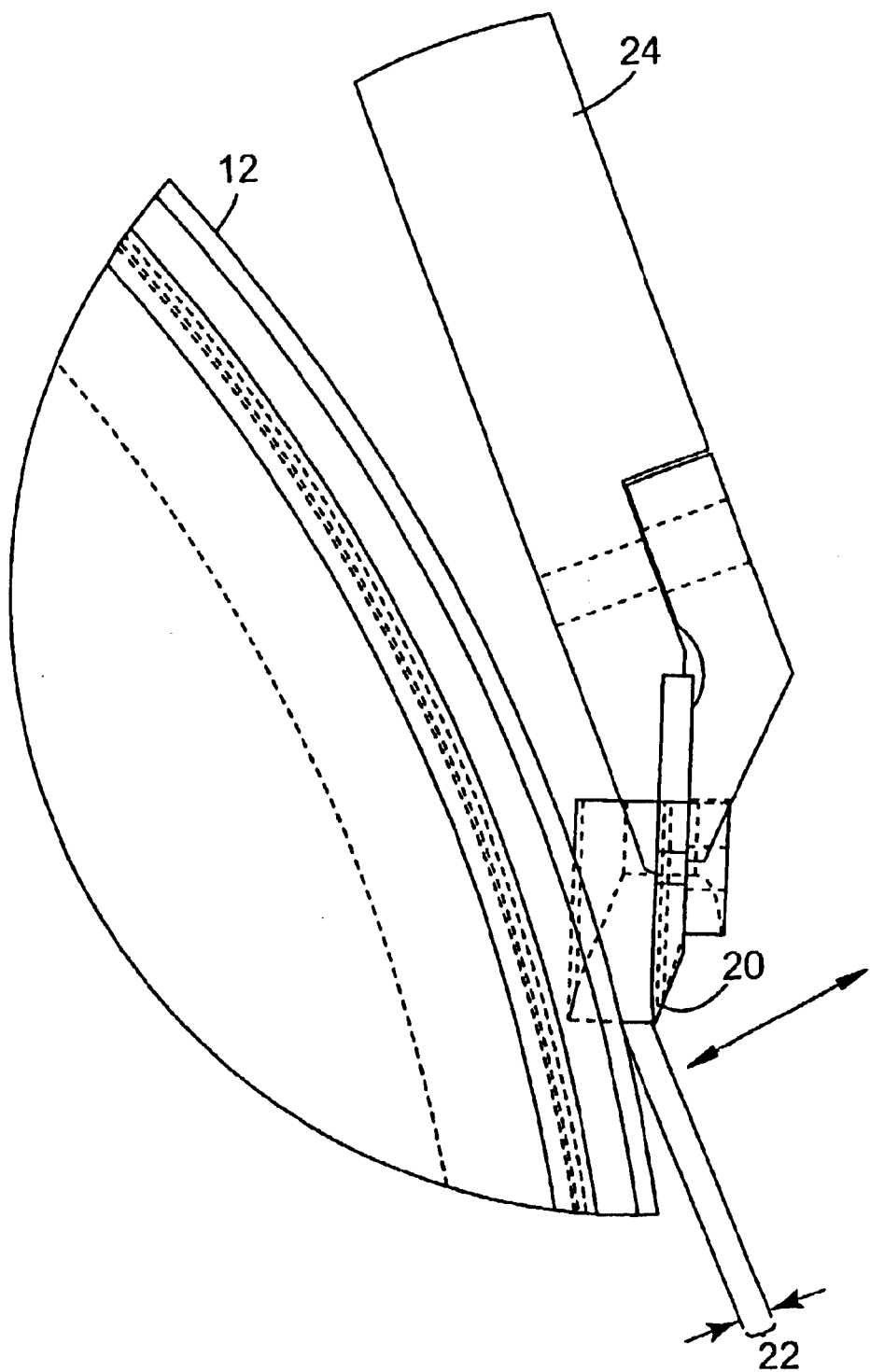
FIG. 5 is a close-up top view of a portion of the apparatus illustrated in FIG. 4 illustrating the dull blade gap.

FIGS. 4 and 5 illustrate the automatic control of dull blade 20 and the resulting adjustment of dull blade gap distance 22. As piston 30 of hydraulic cylinder 32 moves in (to the left in the Figure) or out (to the right in Figure), dull blade 20 moves away from or closer to the periphery of revolvable drum 12, respectively. This action correspondingly increases or decreases dull blade gap distance 22, respectively. Hydraulic cylinder 32 is controlled by hydraulic pressure which, in turn, can be precisely computer-controlled.

The profile of the thickness of skin around the carcass of a hog is not uniform. For example, the skin on the carcass of a hog is much thinner in the belly and much thicker along the back. With knowledge of the variability of the thickness of the skin around the carcass of the animal being skinned, the computer-controlled of hydraulic cylinder 32 can be adjusted in order to match the variability of the thickness of the skin around the carcass. In other words, under computer-control, servo valve driving hydraulic cylinder 32 can be adjusted such that dull blade 20 maintains a dull blade gap distance 22 which is smaller over the belly portion of a hog, for example, and which is larger over the back portion of a hog.

More specifically, is known that the thickness of the skin from the carcass of a hog is relatively thin over the teat area of the carcass, becomes thicker over the flank of the carcass, becomes relatively thin air again between the flank and the back of the carcass, is relatively thicker over the back of the carcass and begin his thinner between the back into teat area of the carcass.

Further, since the profile of the thickness of the skin of the animal been skin can be known, it is not necessary to rely upon any sort of resilience bias, e.g., a spring, or any other sort of measuring device in order to determine or major the actual thickness of the skin of a particular carcass been skinned. Since such resilience bias means and automatic measuring means are subject to error, and any resulting dull blade gap distance 22 relying on such a device is also prone to error.

In contrast, the present invention automatically adjusts dull blade gap distance 22 to match the thickness profile of the skin around the carcass of an exemplary animal of the type being skinned. As a result, the method and apparatus of the present invention are not subject to inaccuracies and imprecision resulting from imprecise resilience bias and imprecise measurement.

Figure 6:
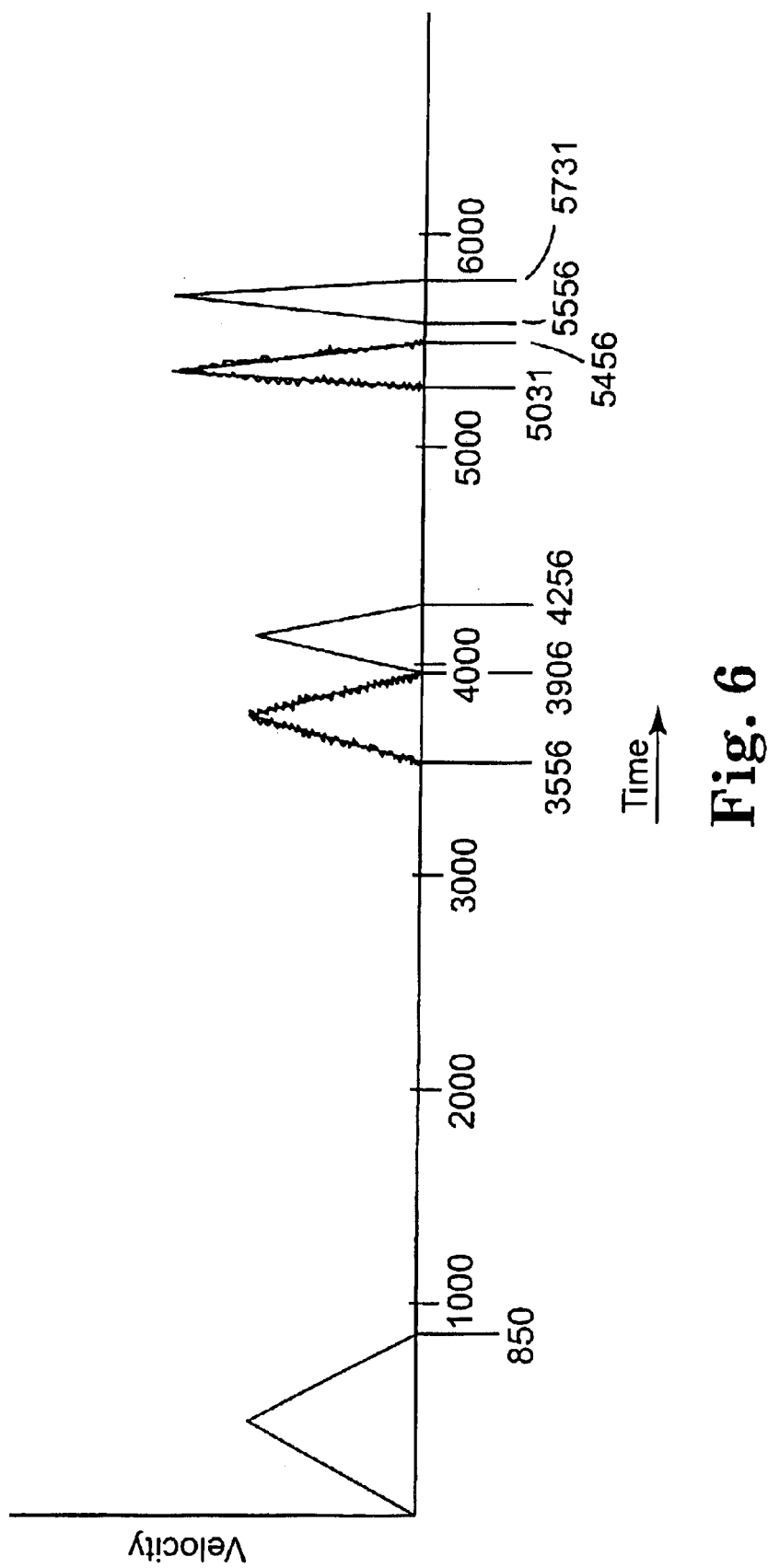
FIG. 6 is a graphical representation of the velocity of the dull blade showing the movement of the dull blade in accordance with an aspect of the present invention.

FIG. 6 illustrates an example of an implementation for the computer-controlled of hydraulic cylinder 32 associative with controlling dull blade 20 and the resulting dull blade gap distance 22. In this example, hog skin in apparatus 10 is constructed with a minimum dull blade gap distance 22 of $\frac{1}{16}$ of an inch (0.0625 inches or 1.59 millimeters) and a maximum dull blade gap distance 22 of $\frac{15}{32}$ of an inch (0.46875 inches or 11.91 millimeters). This results in a range of dull blade gap distance 22 from narrowest two largest of 0.40625 inches (10.32 millimeters). Computer control is constructed in order to step dull blade 20 through this range in 1,108 steps. One rotation of the carcass is divided into 5,731 time periods. The graph in FIG. 6 illustrates the velocity of dull blade 20 as a function of each time period. Assuming that the longitudinal cut on the hog, and, hence, the location around the carcass of the hog at the beginning of the rotation in the skinning process, between the flank and the teat area (belly) of the carcass. As shown in the Figure, during the first 850 encoder counts, dull blade gap distance 22 is closed to $\frac{1}{16}$ of an inch (0.0625 inches or 1.59 millimeters). For the next 2,706 encoder counts (from 850 to 3,556), the dull blade gap distance 22 is set to minimum as the dull blade 20 passes through the teat or belly portion of the carcass. For the next 350 encoder counts (from 3,556 to 3,906) the dull blade gap distance 22 is opened to 0.38 inches (9.65 millimeters) during the passage of dull blade 20 through the flank portion of the carcass. For the next 350 encoder counts (from 3,906 to 4,256) the dull blade gap distance 22 is again decreased to $\frac{1}{16}$ of an inch (0.0625 inches or 1.59 millimeters). For the next 1,025 encoder counts (from 4,256 to 5,281) that dull blade gap distance 22 is maintained at the minimum as the dull blade 20 passes through the portion of the carcass between the flank and the back. For the next 175 encoder counts (from 5,281 to 5,456) the dull blade gap distance 22 is quickly increased again to 0.38 inches (9.65 millimeters). For the next 100 encoder counts (from 5,456 to 5,556) the dull blade gap distance 22 is maintained at a wide thickness as the dull blade 20 passes over the back portion of the carcass. For the remaining 175 encoder counts (from 5,556 to 5,731) the dull blade gap distance 22 is again closed to $\frac{1}{16}$ of an inch (0.0625 inches or 1.59 millimeters). At the end of the cycle, dull blade gap distance 22 is increased to its maximum open position to allow for easy cleaning and removal of any material that is left from the skinning process. When a new carcass is ready for skinning, dull blade gap distance is again closed to the starting position.

Various modifications and alterations of this invention will be apparent to those skilled in the art without departing from the scope and spirit of this invention. It should be understood that this invention is not limited to the illustrative embodiments set forth above.

What is claimed is:

1. An apparatus for removing skin from a torso of an animal, comprising:
    a rotatable drum having a circumference;
    a gripper positioned at a point on said circumference of said rotatable drum adapted to engage a portion of said skin causing said torso of said animal to rotate as said rotatable drum rotates;
    a sharp blade positioned near said point on said circumference of said rotatable drum for cutting said skin from said animal;
    a dull blade spaced a dull blade gap distance away from said circumference of said rotatable drum and a setback distance away from said sharp blade opposite from said gripper, said dull blade adapted to contact said skin of said animal as said animal rotates;
    an adjustment arm coupled to said dull blade for controlling said dull blade gap distance; and
    a controller coupled to said adjustment arm for automatically adjusting dull blade gap distance in accordance with a predetermined profile for said dull blade gap distance which varies around said torso of said animal.

2. An apparatus for removing skin from an animal as in claim 1 wherein said animal is a hog.

3. An apparatus for removing skin from an animal as in claim 2 wherein said controller actively adjusts said dull blade gap distance.

4. An apparatus for removing skin from an animal as in claim 3 wherein said controller is a programmed digital computer.

5. An apparatus for removing skin from an animal as in claim 2 wherein said skin of said hog is thicker around certain parts of said torso of said animal than around other parts of said torso of said animal, wherein said predetermined profile specifies that:
    said dull blade gap distance is wider where said certain parts of said torso of said animal are thicker and
    said dull blade gap distance is narrower where said other parts of said torso of said animal is thinner.

6. An apparatus for removing skin from an animal as in claim 5 wherein said hog has a stomach and a back, wherein said skin is thinner on said stomach, wherein said skin is thicker on said back, and wherein said predetermined profile specifies that:

said dull blade gap distance is narrower when said dull blade contacts said stomach of said hog; and said dull blade gap distance is wider when said dull blade contacts said back of said hog.

7. An apparatus for removing skin from an animal as in claim 5 wherein said torso of said hog has a teat area, a flank and a back and wherein said predetermined profile specifies that:

said dull blade gap distance is narrower when said dull blade contacts said teat area of said hog;

said dull blade gap is wider when said dull blade contacts said flank of said hog;

said dull blade gap is narrower when said dull blade contacts said torso of said hog between said flank and said back of said hog;

said dull blade gap is wider when said dull blade contacts said back of said hog; and said dull blade gap is narrower when said dull blade gap contacts said torso of said hog between said back and said teat area of said torso of said hog.

8. An apparatus for removing skin from an animal as in claim 5 wherein said dull blade gap distance is opening wide after said torso of said hog has completed a rotation of said dull blade around said torso.

9. A method of removing skin from an animal having a torso using an apparatus having a rotatable drum having a circumference, a gripper positioned at a point on said circumference of said rotatable drum adapted to engage a portion of said skin causing said carcass of said animal to rotate as said rotatable drum rotates, a sharp blade positioned near said point on said circumference of said rotatable drum for cutting said skin from said animal, a dull blade spaced a dull blade gap distance away from said circumference of said rotatable drum and a setback distance away from said sharp blade opposite from said gripper, said dull blade adapted to contact said skin of said animal as said animal rotates, comprising the steps of:

gripping a portion of said skin of said torso of said animal by said gripper;

rotating said drum causing said torso of said animal to rotate forcing said dull to peel said skin from said torso of said animal as said torso of said animal contacts said dull blade; and adjusting said dull blade gap distance in accordance with a predetermine profile which varies around said torso of said animal.

10. A method of removing skin from an animal as in claim 9 wherein said animal is a hog.

11. A method of removing skin from an animal as in claim 10 wherein said skin of said hog is thicker around certain parts of said torso of said animal than around other parts of said torso of said animal and wherein in said adjusting step said dull blade gap distance is wider where said certain parts of said torso of said animal are thicker and said dull blade gap distance is narrower where said other parts of said torso of said animal is thinner.

12. A method of removing skin from an animal as in claim 11 wherein said hog has a stomach and a back, wherein said skin is thinner on said stomach, wherein said skin is thicker on said back, wherein in said adjusting step said dull blade gap distance is narrower when said dull blade contacts said stomach of said hog and said dull blade gap distance is wider when said dull blade contacts said back of said hog.

13. A method of removing skin from an animal as in claim 11 wherein said torso of said hog has a teat area, a flank and a back and wherein in said adjusting step:

said dull blade gap distance is narrower when said dull blade contacts said teat area of said hog;

said predetermined profile specifies that said dull blade gap is wider when said dull blade contacts said flank of said hog;

said predetermined profile specifies that said dull blade gap is narrower when said dull blade contacts said torso of said hog between said flank and said back of said hog;

said predetermined profile specifies that said dull blade gap is wider when said dull blade contacts said back of said hog; and said predetermined profile specifies that said dull blade gap is narrower when said dull blade gap contacts said torso of said hog between said back and said teat area of said torso of said hog.

14. A method of removing skin from an animal as in claim 13 further comprising the step of opening said dull blade gap distance wide after said torso of said hog has completed one rotation of said dull blade around said torso.

* * * * *